US006925193B2

(12) United States Patent
Farmer (10) Patent No.: US 6,925,193 B2
(45) Date of Patent: Aug. 2, 2005

(54) IMAGE PROCESSING SYSTEM FOR DYNAMIC SUPPRESSION OF AIRBAGS USING MULTIPLE MODEL LIKELIHOODS TO INFER THREE DIMENSIONAL INFORMATION

(75) Inventor: Michael Edward Farmer, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 701 days.

(21) Appl. No.: 09/901,805

(22) Filed: Jul. 10, 2001

(65) Prior Publication Data

US 2003/0016845 A1 Jan. 23, 2003

(51) Int. Cl.[7] .................................................. G06K 9/00
(52) U.S. Cl. ....................................................... 382/103
(58) Field of Search ................................. 382/107, 291, 382/103, 104; 352/39; 307/10.1; 701/36, 45, 49; 280/728.1; 348/94, 169, 143, 154, 155; 700/13, 56, 64, 66; 340/686.1, 815.58; 356/614; 73/1.79

(56) References Cited

U.S. PATENT DOCUMENTS

| | | | |
|---|---|---|---|
| 4,179,696 A | 12/1979 | Quesinberry et al. | 342/75 |
| 4,625,329 A | 11/1986 | Ishikawa et al. | 382/104 |
| 4,985,835 A | 1/1991 | Sterler et al. | 701/46 |
| 5,051,751 A | 9/1991 | Gray | 342/107 |
| 5,074,583 A | 12/1991 | Fujita et al. | 280/730.1 |
| 5,229,943 A | 7/1993 | Eigler et al. | 701/46 |
| 5,256,904 A | 10/1993 | Tohbaru | 307/10.1 |
| 5,280,530 A * | 1/1994 | Trew et al. | 382/103 |
| 5,366,241 A | 11/1994 | Kithil | 280/735 |
| 5,398,185 A | 3/1995 | Omura | 701/45 |
| 5,413,378 A | 5/1995 | Steffens, Jr. et al. | 280/735 |
| 5,446,661 A | 8/1995 | Gioutsos et al. | 701/45 |
| 5,490,069 A | 2/1996 | Gioutsos et al. | 701/45 |
| 5,528,698 A | 6/1996 | Kamei et al. | 382/100 |
| 5,570,301 A * | 10/1996 | Barrus | 702/150 |
| 5,890,085 A | 3/1999 | Corrado et al. | 701/47 |
| 5,983,147 A | 11/1999 | Krumm | 701/45 |
| 6,005,958 A | 12/1999 | Farmer et al. | 382/103 |
| 6,018,693 A | 1/2000 | Blackburn et al. | 701/45 |
| 6,026,340 A | 2/2000 | Corrado et al. | 701/47 |
| 6,116,640 A | 9/2000 | Tanaka et al. | 280/735 |
| 6,198,998 B1 | 3/2001 | Farmer et al. | 701/45 |
| 6,272,411 B1 | 8/2001 | Corrado et al. | 701/45 |

(Continued)

FOREIGN PATENT DOCUMENTS

| | | | | |
|---|---|---|---|---|
| GB | 2 236 419 A | 4/1991 | | G08B/21/00 |
| JP | 61-66905 | 6/1994 | | G01B/11/00 |
| JP | 61-66906 | 6/1994 | | G01B/11/00 |
| WO | WO02/30717 | 4/2002 | | B60R/21/01 |

OTHER PUBLICATIONS

"GPS–Based Vehicle Tracking" by Jeffrey Pusan from www.securitydriver.com/aic/stories/article–97.html.

*Primary Examiner*—Andrew W. Johns
*Assistant Examiner*—Shervin Nakhjavan
(74) *Attorney, Agent, or Firm*—Rader, Fishman & Grauer PLLC (57) ABSTRACT

The present invention relates in general to systems used to determine whether airbag deployment should be disabled or modified due to the proximity of the occupant to the airbag. In particular, the present invention is an image processing system that uses an image and signal process that utilizes real-time streaming video-images from a video camera to determine if the occupant is too close to the air bag, or will be to close the air bag by the time that the airbag deploys. In a crash situation, the system quickly determines whether or not the airbag should be disabled or modified. The process uses a multiple-model Kalman filter to infer three-dimensional information from a sequence of two-dimensional images. The system predicts the position and shape of the occupant at a faster rate than the rate in which the camera collects data.

21 Claims, 5 Drawing Sheets

U.S. PATENT DOCUMENTS

| | | | |
|---|---|---|---|
| 6,292,727 B1 * | 9/2001 | Norton | 701/45 |
| 6,397,136 B1 * | 5/2002 | Breed et al. | 701/45 |
| 6,431,592 B2 * | 8/2002 | Seip | 280/735 |
| 6,459,974 B1 | 10/2002 | Baloch et al. | 701/43 |
| 6,577,936 B2 | 6/2003 | Farmer | 701/45 |
| 6,662,093 B2 | 12/2003 | Farmer | 701/43 |
| 2002/0000753 A1 * | 1/2002 | Horikoshi et al. | 307/9.1 |
| 2003/0031345 A1 | 2/2003 | Farmer | 382/103 |
| 2003/0123704 A1 | 7/2003 | Farmer et al. | 382/103 |
| 2003/0133595 A1 | 7/2003 | Farmer et al. | 382/103 |
| 2003/0135346 A1 | 7/2003 | Farmer et al. | 102/150 |
| 2003/0234519 A1 | 12/2003 | Farmer | 280/728.1 |

* cited by examiner

IMAGE PROCESSING SYSTEM FOR DYNAMIC SUPPRESSION OF AIRBAGS USING MULTIPLE MODEL LIKELIHOODS TO INFER THREE DIMENSIONAL INFORMATION

BACKGROUND OF THE INVENTION

The present invention relates in general to systems used to determine whether the deployment of an airbag should be prevented or modified due to the proximity of the occupant to the airbag. In particular, the present invention is an image processing system that receives a stream of two-dimensional images and applies iterative and probability-weighted processes to infer three-dimensional characteristics to those images, and predict whether the upper torso of the occupant would be within the At-Risk-Zone ("ARZ") by the time that an air bag would actually deploy.

Conventional airbag deployment systems have contributed significantly to the safety of occupants in automobile crashes. However, there may be occasions when due to the physical proximity of an occupant to an airbag, that the deployment of an airbag may not be desirable. Airbag disablement systems are known in the art. Some of those systems attempt to process the distance between the occupant and the airbag. However, there are several significant problems with that existing art.

First, such systems require highly expensive cameras. Timing is critical to any system used to determine whether or not an airbag should be deploy. A standard video camera operates at a frequency between 50–100 hz and captures between 50 to 100 image frames per second of operation. Effective airbag determinations require more frequent updates, of approximately 200 updates per second (200 hz). Moreover, it would be desirable for an image processing system to predict the occupant's position in advance instead of merely identifying the occupant's location at the time that the image is captured. It would also be desirable if accurate predictions could be generated at a faster rate than the camera speed so that a less expansive standard video camera could be used instead of a more expensive highly specialized high-speed camera.

Second, prior art systems are highly susceptible to "noise" because prior art systems focus solely on the most recent image, and ignore the series of images captured mere fractions of a second earlier. "Noise" results from several factors, including the inherent imperfections of the segmentation process which is the process of extracting a segmented image, an image of the occupant, in isolation from the surrounding area, from the ambient image, an image of the occupant and an image of the surrounding area. It would be desirable for an image processing system to utilize an iterative process that would integrate the information contained in the most recent image into a comprehensive framework that includes prior predictions and indirectly, the prior images used to make those prior predictions. It would also be desirable for all predictions to be weighted predictions. Moreover, it would be helpful for such weighted predictions to include probabilities associated with pre-defined occupant states such as leaning left towards the driver, leaning right away from the driver, or sitting upright, and predefined occupant modes such as crash, stationary, or human.

The third problem with prior art systems is that they rely on two-dimensional images. The images captured by cameras, including video cameras, are inherently two dimensional images. It would be useful if three-dimensional information could be inferred from a series of two dimensional images. Moreover, it would be helpful if predefined occupant states were incorporated into the iterative process of deriving a three-dimensional information from a series of two-dimensional images.

SUMMARY OF THE INVENTION

This invention relates to an image processing system used to determine whether the proximity of an occupant of a seat to an airbag is sufficiently close such that the airbag deployment system should be either disabled or modified. In particular, the present invention is an image processing system that incorporates current measurements with past predictions in order to determine the location of an occupant relative to the position of an airbag deployment system.

Two iterative multiple model Kalman filters are used to incorporate a measurement of the most recent image into the ongoing series of past predictions and image measurements relating to the position and shape of the occupant.

A camera or some other sensor is used to capture an ambient image, the image of the occupant and the area surrounding the occupant. A segmented image, the image of the occupant with the surrounding area removed from the image, is obtained through a process called segmentation. The segmented image is then subjected to a shape fitting process that fits an upper shape to the upper torso of the occupant. A lower shape is fitted from the occupant's hips down to the occupant's feet. The two shapes can overlap at one point, the centroid of the occupant, in the area of the occupant's hips. In the preferred embodiment, an ellipse is the shape used and the relevant centroid is the centroid of the upper ellipse.

Tracking and predicting processes are performed using multiple model Kalman filters. The process involves two parallel and simultaneous sub-processes. One process tracks important information relating to the shape of the occupant image, and other tracks important information relating to the motion of the occupant image.

The shape tracker and predictor process tracks and predicts the shape of the occupant by tracking and predicting (collectively "shape variables"): the "major axis" of the ellipse, a bisecting line through the longer cross section of the ellipse; the "minor axis" of the ellipse, a bisecting line through the shorter cross section of the ellipse; and the y-coordinate or "height" of the centroid in the segmented image. For each shape variable, the velocity and acceleration, in addition to position, are each tracked and predicted.

An occupant's shape is defined into one of several pre-defined "states" such as leaning towards the driver ("left"), leaning away from the driver ("right"), and sitting upright ("center"). All processing by the shape tracker is modeled in each of the pre-defined states. Using the probabilities associated with potential transitions from one state to another state, and incorporating past predictions through the use of an iterative and weighted Kalman filter, the shape tracker and predictor will determine which state the occupant is in by determining which model ellipse most closely resembles the most recently measured ellipse. Thus, even though the tilt angle towards or away from the driver (the "sideways tilt angle" $\phi$), is perpendicular to the image plane and thus is not visible in a two-dimensional image, the system can infer valuable three-dimensional information about a two-dimensional image.

The determination of shape state is then used to update the estimate for all shape variables. A shape estimate is updated using incoming measurements, state predictions, and the Kalman filter gain matrices. The shape tracker and predictor can be used to generate estimates more frequently than a camera can capture images. Thus, the system does not require the use of a high-speed video camera.

The motion tracker and predictor processes information relating to the position, velocity, and acceleration of the occupant. "Motion variables" include the x-coordinate of the centroid which is used to measure the "distance" between the x-coordinate and the airbag and the "forward title angle" θ, the degree to which the occupant is tilted towards the front of the vehicle.

Position, velocity, and acceleration are tracked and predicted for all motion variables. An occupant's motion is defined into one of several predefined "modes" such as "stationary," "human," or "crash". All processing by the motion tracker and predictor is modeled in each of the predefined modes. Predictions are generated for each mode. Using the probabilities associated with potential transitions from one mode to another mode, and incorporating past predictions through the use of an iterative and weighted Kalman filter, the motion tracker and predictor will generate one combined estimate for each motion variable. The motion tracker and predictor can be used to generate estimates more frequently than a camera can capture images. Thus, the system does not require the use of a high-speed video camera.

The final step is the actual determination of whether or not the occupant is within an At-Risk-Zone ("ARZ"). An ARZ Intrusion Indicator determines whether the upper torso of the occupant would be within the ARZ at the time in which an airbag would deploy. The ARZ Intrusion Indicator also determines whether the person is leaning so far towards the driver that they miss the ARZ. For different vehicle models, the ARZ will be set differently. This calculation is updated very quickly using the outputted state transition matrix which allows the system to predict ahead the position and shape at a rate much more quickly than the rate at which the camera collects data.

Various aspects of this invention will become apparent to those skilled in the art from the following detailed description of the preferred embodiment, when read in light of the accompanying drawings.

DETAILED DESCRIPTION OF THE PREFERRED EMBODIMENT

A. Partial View of Surrounding Environment

Figure 1:
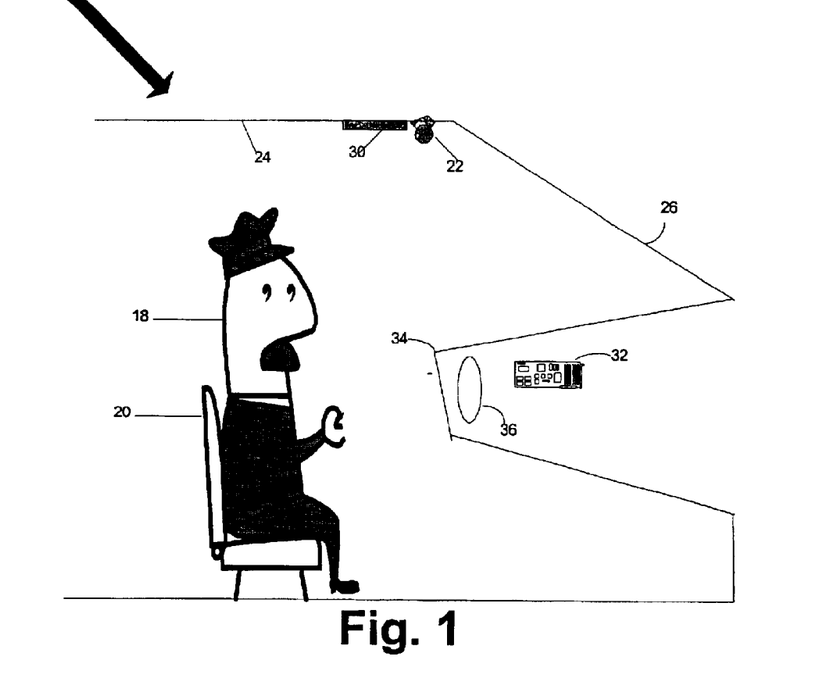
FIG. 1 shows a partial view of the surrounding environment for one potential embodiment of the invention.

Referring now to the drawings, illustrated in FIG. 1 is a partial view of the surrounding environment for one potential embodiment of the invention, an image processing system 16. If an occupant 18 is present, the occupant 18 sits on a seat 20. In the preferred embodiment, a camera or other sensor 22 is attached in a roof liner 24, above the occupant 18 and closer to a front windshield 26 than the occupant 18. The camera 22 should be placed in a slightly downward angle towards the occupant 18 in order to capture changes in the angle of the occupant's 18 upper torso resulting from forward or backward movement in the seat 20. There are or course many potential locations for a camera 22 that are well known in the prior art. Similarly, a computer system 30 could be located virtually anywhere on a vehicle. In the preferred embodiment, the computer system 30 is located near the camera 22 to avoid sending camera images through long wires. An airbag controller 32 is shown in an instrument panel 34, although the present invention could still function even if the airbag deployment system were located in a different environment. Similarly, an airbag deployment system 36 is also located in the instrument panel 34 in front of the occupant 18 and the seat 20.

B. High Level Process Flow

Figure 2:
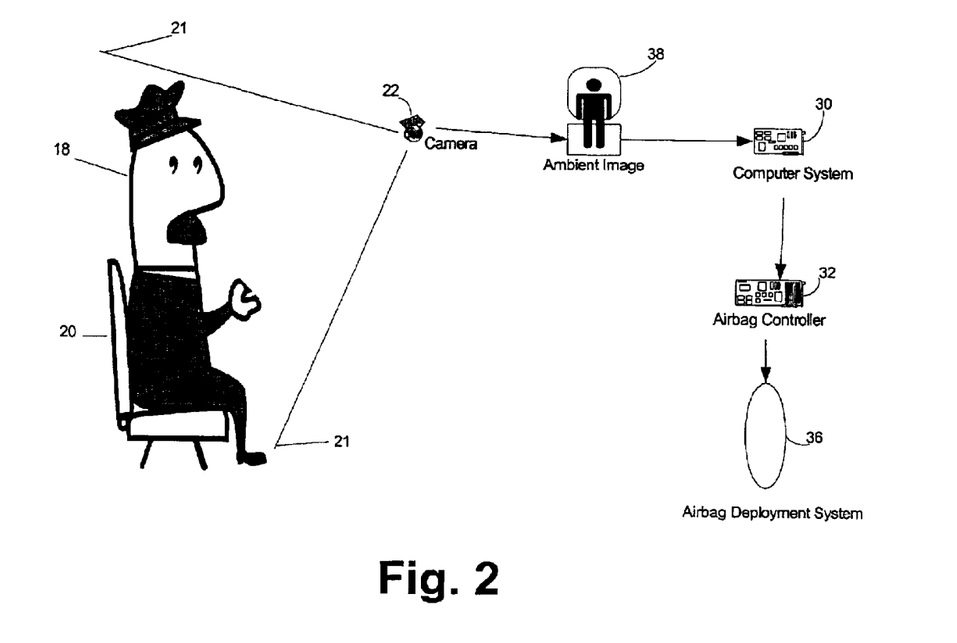
FIG. 2 shows a high-level process flow of the use of the image processing system.

FIG. 2 discloses a very basic and high level process flow surrounding the use of the image processing system 16. An ambient image 38 of a seat area 21 including both the occupant 18 and the seat area 21 is captured by the video camera 22 or any other sensor capable of rapidly capturing a series of images. In the figure, the seat area 21 includes the entire occupant, although under some circumstances and embodiments, only a portion of the occupant's 18 image will be captured, particularly if the camera 22 is positioned in a location where the lower extremities may not be viewable. The ambient image 38 is sent to the computer system 30. The computer system 30 determines whether or not the occupant 18 would be in as At-Risk-Zone ("ARZ") at the time of an airbag deployment. The ARZ determination is sent to the airbag controller 32 which in turn controls the airbag deployment system 36.

C. Computer System Process Flow

Figure 3:
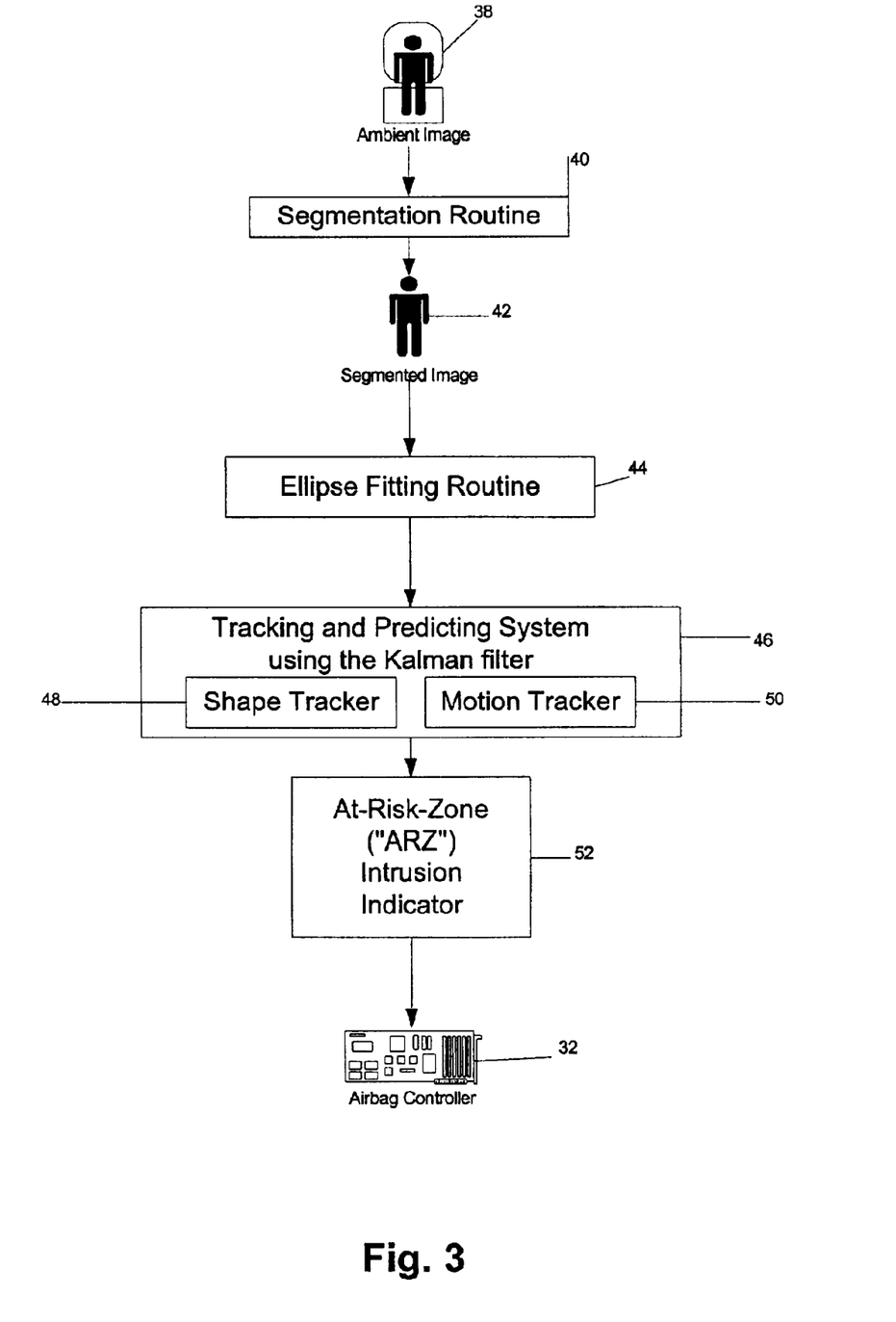
FIG. 3 shows a high level block diagram of an image processing system.

FIG. 3 gives a high level process flow as to the inner workings of the computer system 30. The ambient image 38 of the occupant 18 and surrounding seat area 21 is an input of the computer system 30. A segmentation routine 40 is performed which extracts a segmented image 42 of the occupant, an image which includes only the occupant and not the surrounding seat area 21, from the ambient image 38. The segmentation process 40 is well known under existing art. Segmentation 40 is accomplished electronically through the use of software, and thus segmentation could be performed in a computer separate from the computer system in 30.

The segmented image 42 of the occupant 18 is then subject to an ellipse fitting routine 44. An upper ellipse is fitted around the upper torso of the occupant 18. The upper torso includes everything from the occupant's 18 head down to the occupant's hips. A lower ellipse is fitted from the occupant's 18 toes up to the occupant's 18 hips. Both ellipses overlap at one point which can be referred to as the junction centroid 53, but the centroid 54 is preferably identified as the center of the upper ellipse 58. The output of the ellipse fitting routine 44 will be discussed in greater detail below along with the discussion relating to FIGS. 4, 5, and 6. The process and practice of generating an upper ellipse, a lower ellipse, and a centroid to represent different parts of the occupant 18 is well known in the art. In the preferred embodiment of the invention, the ellipse fitting routine 44 is applied by the computer system 30, but in other embodiments, the ellipse fitting routine 44 could be performed by a separate computer from the computer system at 30.

Information relating to the upper ellipse, lower ellipse, and centroid are then sent to a tracking and predicting system 46. The tracking and predicting system 46 applies distinct sub-processes simultaneously with each other. A shape tracker 48 tracks variables relating to the "shape" of the upper ellipse. This process is described in greater detail below in the discussion relating to FIG. 9. A motion tracker 50 tracks variables relating to the "motion" of the upper ellipse, specifically with respect the horizontal distance between the occupant 18 and the airbag deployment system 36 in the instrument panel 34. This process is described in greater detail below in the discussion relating to FIG. 10.

Every embodiment of the computer system 30 needs a tracking and predicting system 46 track and predict the position, velocity, and acceleration of certain key measurements relating to shape and motion of the upper torso of the occupant 18 using a multiple model and iterative process, which incorporates the latest measurement into a series of ongoing measurements and predictions. In the preferred embodiment of the invention, the tracking and predicting system 46 incorporates what is known in the prior art as a Kalman filter. A Kalman filter is very powerful in that it incorporates past predictions and measurements in a weighted fashion, supports estimations of past, present, and even future states, and it can do so even when the precise nature of the modeled system is unknown. An academic paper entitled "An Introduction to the Kalman Filter" by Greg Welch and Gary Bishop is attached and incorporated by reference. The general equation for the Kalman filter is as follows:

$$X_{(new\ prediction)} = X_{(old\ prediction)} + \text{Gain}[-X_{(old\ prediction)} + X_{(measured)}]$$

In a Kalman filter, "Gain" represents the perceived accuracy of the most recent measurement. A Gain of 0 indicates such a poor measurement that it is of no value, and thus the new estimate $X_{(new\ estimate)}$ is simply the value of the old estimate $X_{(old\ estimate)}$:

$$X_{(new\ estimate)} = X_{(old\ estimate)} + 0[-X_{(old\ estimate)} + X_{(measured)}]$$

$$X_{(new\ estimate)} = X_{(old\ estimate)} + 0$$

$$X_{(new\ estimate)} = X_{(old\ estimate)}$$

A Gain of 1 indicates such confidence in the most recent measurement $X_{(measured)}$ that the new prediction $X_{(new\ estimate)}$ is simply the value of the most recent measurement $X_{(measured)}$:

$$X_{(new\ estimate)} = X_{(old\ estimate)} + 1[-X_{(old\ estimate)} + X_{(measured)}]$$

$$X_{(new\ estimate)} = X_{(old\ estimate)} - X_{(old\ estimate)} + X_{(measured)}]$$

$$X_{(new\ estimate)} = X_{(measured)}$$

In a real world application, the Gain is virtually always greater than 0 and less than 1. The Gain thus determines to what degree a new measurement can change the previous aggregate estimate or prediction of the location of an object, in the case of the instant invention, the occupant 18 is the object being tracked. Both the shape tracker 48 and the motion tracker 50 are described in greater detail below, along with FIGS. 9 and 10 respectively.

The output from both the shape tracker 48 and the motion tracker 50 are sent to an At-Risk-Zone ("ARZ") Intrusion Indicator 52. The ARZ Intrusion Indicator 52 determines the proximity of the closest point of the upper ellipse relative to the instrument panel 34, the distance which defines the ARZ. The ARZ Intrusion Indicator 52 also determines whether or not the occupant 18 is leaning so far toward the driver that the occupant 18 will miss the ARZ altogether. Calculations in the ARZ Intrusion Indicator 52 are done more quickly than the rate in which the camera 22 collects data. The ARZ Intrusion Indicator 52 is specifically configured for the particular model of vehicle. Thus, a minivan will typically have a different ARZ than a compact automobile. The ARZ Intrusion Indicator is discussed in greater detail below, along with the discussion relating to FIG. 5.

The determination by the ARZ Intrusion Indicator 52 is sent to the airbag controller 32 so that the airbag controller 32 can implement the appropriate response with the airbag deployment system 36. The deployment of the airbag at 36 can either be totally disabled or merely modified as a result of the ARZ determination made at 52.

D. Ellipse Fitting Routine

Figure 4:
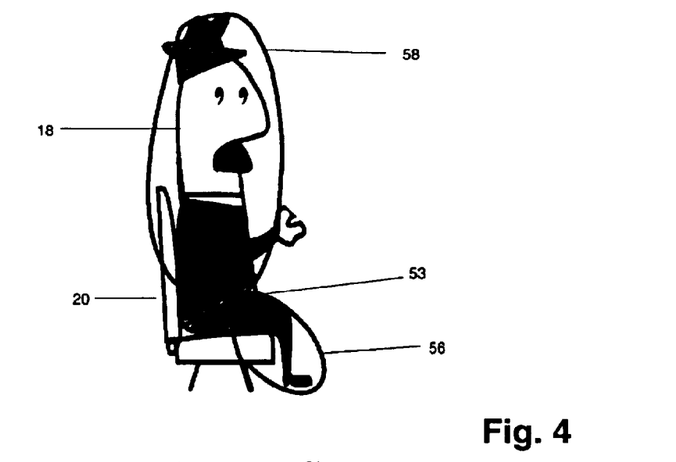
FIG. 4 shows the application of the ellipse fitting process.

FIG. 4 illustrates the ellipse fitting routine 44 implemented by the computer system 30. The upper ellipse 58 extends from the hips up to the head of the occupant 18. The lower ellipse 56 extends down from the hips to include the feet of the occupant 18. If the entire area from an occupant's 18 hips down to the occupant's 18 feet is not visible, a lower ellipse is generated to represent what is visible. Both ellipses overlap at a point that can be known as the junction centroid 53, although the centroid 54 is preferably the center of the upper ellipse 58. In non-preferred embodiments, shapes other than ellipses are used to represent the upper and lower parts of an occupant 18. The ellipse fitting routine is well known in the art. The image processing system need not utilize the lower ellipse 56, and it is preferable to generate the centroid 54 with respect to the upper ellipse 58.

Figure 5:
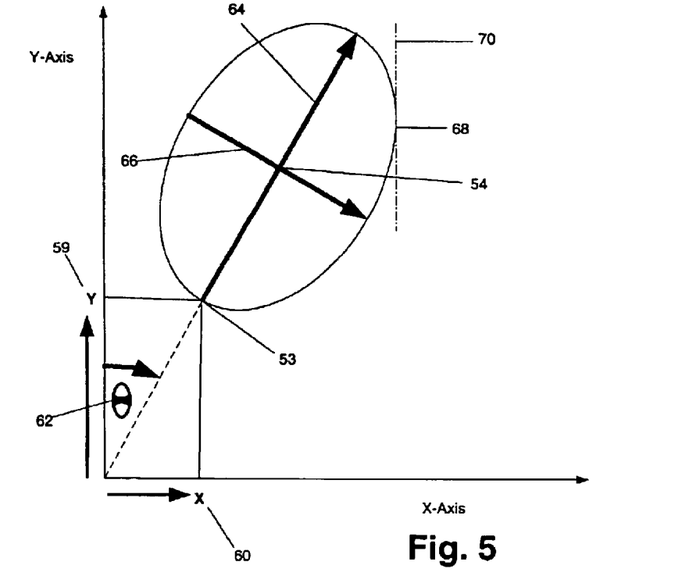
FIG. 5 show an upper torso ellipse with all corresponding shape variables and motion variables (excluding velocity and acceleration derivations).

FIG. 5 illustrates many of the characteristics that can be inputted into the computer system 30 from the ellipse fitting routine 44. Motion characteristics include the x-coordinate ("distance") 60 of the junction centroid 53 and the forward tilt angle ("θ") 62. Shape measurements include the y-coordinate ("height") 59 of the junction centroid 53, the length of the major axis of the ellipse ("major") 64 and the length of the minor axis of the ellipse ("minor") 66. Other shape measurements include the forward-most point 68 of the upper ellipse 58 (in the x-coordinate direction), which point 68 defines a vertical plane 70. Rate of change information, such as velocity and acceleration, are also captured for all shape and motion measurements, so in the preferred embodiment of the invention there are nine shape characteristics (height, height', height", major, major', major", minor, minor', and minor") and six motion characteristics (distance, distance', distance", θ, θ', and θ"). The sideways tilt angle Φ is not shown because it is perpendicular to the image plane, and this the sideways title angle Φ is derived, not measured, as discussed in greater detail below.

Figure 6:
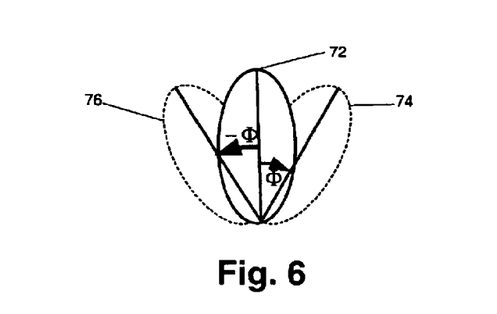
FIG. 6 shows three potential shape states and three potential sideways tilt angles.

FIG. 6 illustrates the sideways tilt angle "(Φ)" 73. In the preferred embodiment of the invention, there are only three shape states, leaning left towards the driver (left) 76, sitting upright (center) 72, and leaning right away from the driver (right) 74, with tilt sideways tilt angles of −Φ, 0, and Φ. In the preferred embodiment, Φ is set at a value between 15 and 40 degrees, depending on the nature of the vehicle being used.

E. Markov Probability Chains

The present invention is directed to a multiple-model probability weighted implementation of a Kalman filter for all shape characteristics and all motion characteristics. Each shape characteristic has a separate Kalman filter equation for each shape state. Similarly, each motion characteristic has a separate Kalman filter equation for each motion mode. In every embodiment of the invention, the occupant 18 has at least one shape state and at least one motion mode. There are certain predefined probabilities associated with a transition from one state to another state. These probabilities can best be illustrated through the use of Markov chains.

Figure 7:
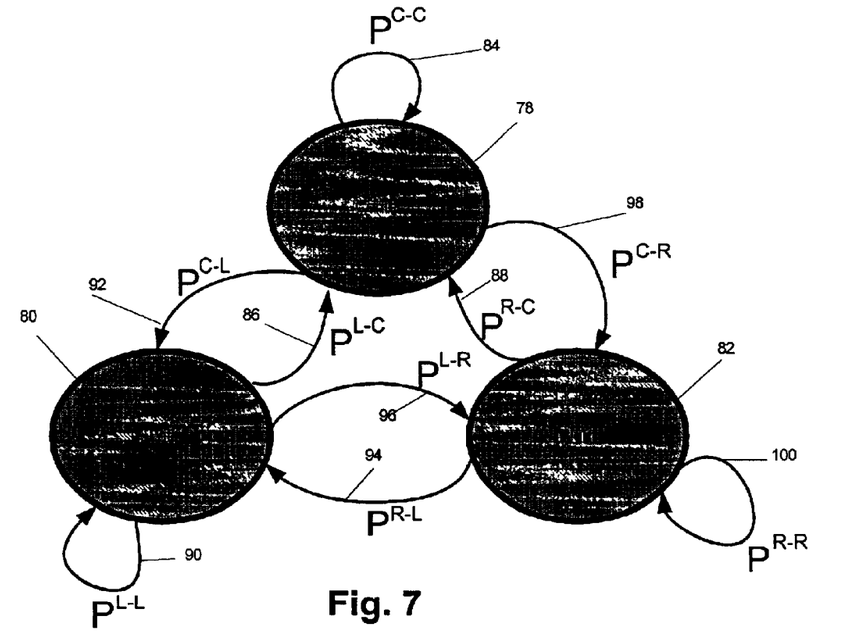
FIG. 7 shows a markov chain of probabilities relating to the three shape states of left, right, and center.

FIG. 7 illustrates the three shape states used in the preferred embodiment of the invention. In the preferred embodiment, an occupant 18 is either leaning towards the driver ("left") 80, sitting upright ("center") 78, or leaning away from the driver ("right") 82. The probability of an occupant being in a particular state and then ending in a particular state can be identified by lines originating at a particular shape state with arrows pointing towards the subsequent shape state. For example, the probability of an occupant in center state remaining in center state $P^{C-C}$ is represented by the arrow at 84. The probability of moving from center to left $P^{C-L}$ is represented by the arrow 92 and the probability of moving from center to right $P^{C-R}$ is 98. The total probabilities resulting from an initial state of center 78 must add up to 1.

$$P^{C-C}+P^{C-L}+P^{C-R}=1.0$$

Furthermore, all of the probabilities originating from any particular state must also add up to 1.0.

The arrow at 86 represents the probability that a left tilting occupant 18 will sit centered $P^{L-C}$, by the next interval of time. Similarly, the arrow at 96 represents the probability that a left tilting occupant will tilt right $P^{L-R}$ by the next interval of time, and the arrow at 90 represents the probability that a left tilting occupant will remain tilting to the left $P^{L-L}$. The sum of all possible probabilities originating from an initial tilt state of left must equal 1.

$$P^{L-C}+P^{L-L}+P^{L-R}=1.0$$

Lastly, the arrow at 100 represents the probability that a right tilting occupant will remain tilting to the right $P^{R-R}$, the arrow at 88 represents the probability that a right tilting occupant will enter a centered state $P^{R-C}$, and the arrow at 94 represents the probability that an occupant will tilt towards the left $P^{R-L}$. The sum of all possible probabilities originating from an initial tilt state of right equals 1.

$$P^{R-C}+P^{R-L}+P^{R-R}=1.0$$

As a practical matter, the typical video camera 22 used in the preferred embodiment captures between 50 to 100 frames each second. Thus, it is essentially impossible for a left 80 leaning occupant to become a right 82 leaning occupant, or for a right 82 leaning occupant to become a left 80 leaning occupant, in a mere 1/50 of a second. It is far more likely that a left 80 leaning occupant will first enter a center state 78 before becoming a right 82 leaning occupant, and similarly, it is far more realistic for a left 80 leaning occupant to become a centered 78 occupant before becoming a right 82 leaning occupant. Thus, in the preferred embodiment of, $P^{L-R}$ at 96 is always set at zero and $P^{R-L}$ at 94 will also always be set at zero. The three probability equations relating to shape state are thus as follows:

$$P^{C-C}+P^{C-L}+P^{C-R}=1.0$$

$$P^{R-C}+P^{R-R}=1.0$$

$$P^{L-C}+P^{L-L}=1.0$$

Figure 8:
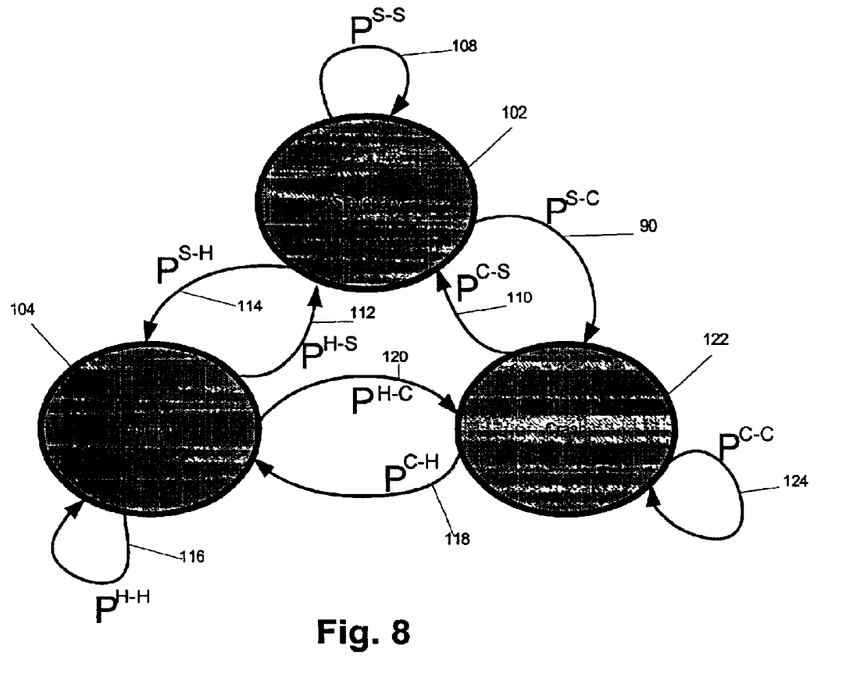
FIG. 8 shows a markov chain of probabilities relating to the three motion modes of human, stationary, and crash.

FIG. 8 illustrates a similar Markov chain to represent the relevant probabilities relating to motion modes. The preferred embodiment of the invention uses three motion modes: stationary 102, represents a human occupant 18 in a mode of stillness, such as while asleep; human 104, represents a occupant 18 behaving as a typical passenger in an automobile or other vehicle, one that is moving as a matter of course, but not in an extreme way; and crash 122, represents the occupant 18 of a vehicle that is in a mode of crashing.

The probability of an occupant being in a particular state and then ending in a particular state can be identified by lines originating in the current state with arrows pointing to the new state. For example, the probability of an occupant in a stationary state remaining in stationary state $P^{S-S}$ is represented by the arrow at 108. The probability of moving from stationary to human $P^{S-H}$ is represented by the arrow 114 and the probability of moving from stationary to crash $P^{S-C}$ is 90. The total probabilities resulting from an initial state of stationary 102 must add up to 1.

$$P^{S-S}+P^{S-H}+P^{S-C}=1.0$$

Similarly, the probability of human to human is $P^{H-H}$ at 116, human to stationary is $P^{H-S}$ at 112, and human to crash is $P^{H-C}$ at 120, and stationary to crash $P^{H-C}$ is 90. The total probabilities resulting from an initial state of stationary 102 must add up to 1.

$$P^{H-H}+P^{H-C}+P^{H-S}=1.0$$

Lastly, the probability of going from crash to crash is $P^{C-C}$ at 124, crash to stationary is $P^{C-S}$ at 110, and crash to human is $P^{C-H}$ at 118. The total probabilities resulting from an initial state of crash 122 must add up to 1.

$$P^{C-C}+P^{C-S}+P^{C-H}=1.0$$

As a practical matter, it is highly unlikely but not impossible for an occupant 18 to ever leave the state of crash at 122 once that state has been entered. Under most scenarios, a crash at 122 ends the trip for the occupant 18. Thus, in the preferred embodiment, $P^{C-H}$ is set to a number very close to zero and $P^{C-S}$ is also set to number very close to zero. The three equations for motion mode probabilities in the preferred embodiment are as follows:

$$P^{C-C}+P^{C-H}+P^{C-S}=1.0$$

$$P^{H-H}+P^{H-C}+P^{H-S}=1.0$$

$$P^{S-C}+P^{S-H}+P^{S-S}=1.0$$

The transition probabilities associated with the various shape states and motion modes are used to generate a Kalman filter equation for each combination of characteristic and state. The results of those filters can then be aggregated in to one result, using the various probabilities to give the appropriate weight to each Kalman filter. All of the probabilities are predefined by the user of the invention.

Figure 9:
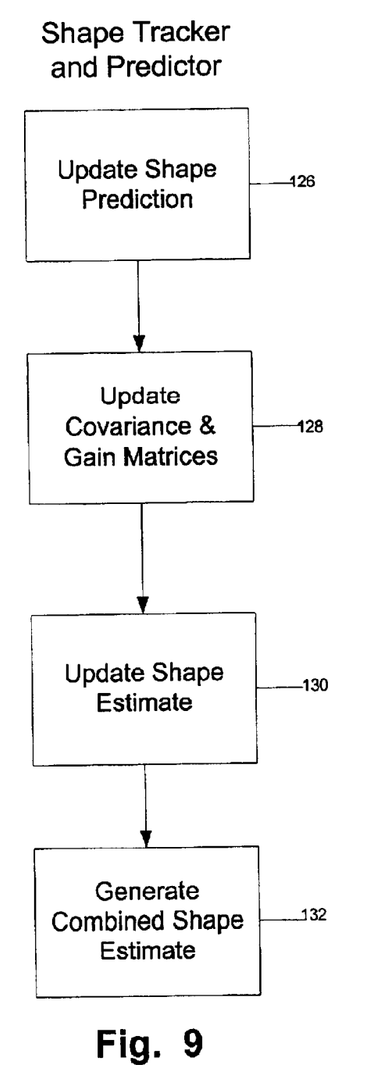
FIG. 9 shows the detailed process flow for determining the shape of the occupant.
Figure 10:
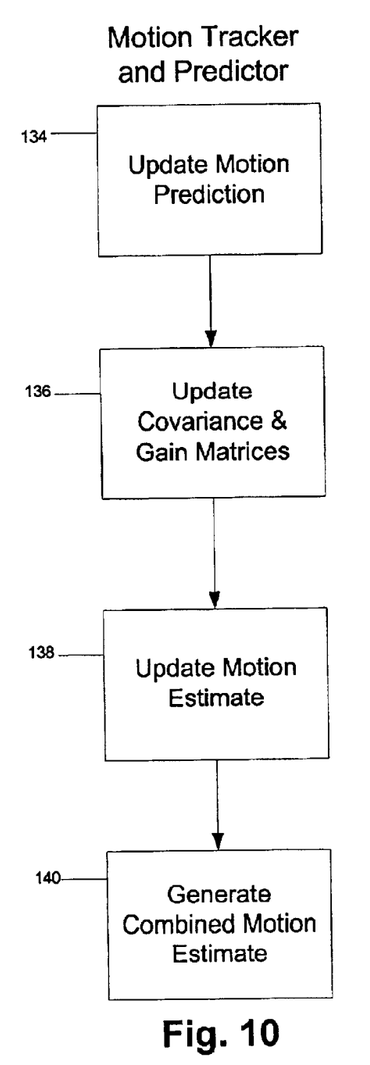
FIG. 10 shows the detailed process flow for determining the motion of the occupant.

The markov chain probabilities provide a means to weigh the various Kalman filters for each characteristic and for each state and each mode. The tracking and predicting system 46 incorporates the markov chain probabilities in the form of two subsystems, the shape tracker and predictor 48 and the motion tracker and predictor 50.

F. Shape Tracker and Predictor

FIG. 9 discloses a detailed flow chart for the shape tracker and predictor 48. In the preferred embodiment of the invention, the shape tracker and predictor 48 tracks and predicts the major axis of the upper ellipse ("major"), the minor axis of the upper ellipse ("minor"), and the y-coordinate of the centroid ("height"). Each characteristic has a vector describing position, velocity, and acceleration information for the particular characteristic. The major vector is [major, major, major], with major representing the rate of change in the major or velocity and major representing the rate of change in major velocity or acceleration. Accordingly, the minor vector is [minor, minor, minor], and the height vector is [height, height, height]. Any other shape vectors will similarly have position, velocity, and acceleration components. The first step in the shape tracking and prediction process is an update of the shape prediction at 126.

1. Update Shape Prediction

An update shape prediction process is performed at 126. This process takes the last shape estimate and extrapolates that estimate into a future prediction using a transition matrix.

Updated Vector Prediction=Transition Matrix*Last Vector Estimate

The transition matrix applies Newtonian mechanics to the last vector estimate, projecting forward a prediction of where the occupant 18 will be on the basis of its past position, velocity, and acceleration. The last vector estimate is produced at 130 as described below. The process from 126 to 128, from 128 to 130, and from 130 to 132, loops back to 126. The process at 126 requires that an estimate be previously generated at 130, so processing at 126 and 128 is not invoked the first time through the repeating loop that is steps 126–132.

The following equation is then applied for all shape variables and for all shape states, where x is the shape variable, t represents change over time (velocity), and ½ t² represents acceleration:

$$\text{Updated Vector Prediction} = \begin{pmatrix} 1 & t\frac{1}{2} & t^2 \\ 0 & 1 & t \\ 0 & 0 & 1 \end{pmatrix} * \begin{pmatrix} x \\ x \\ x \end{pmatrix}$$

In the preferred embodiment of the invention, there would be nine updated vector predictions at 134 because there are three shape states and three non-derived shape variables in the preferred embodiment, and 3×3=9.

The updated shape vector predictions are:
Updated major for center state.
Updated major for right state.
Updated major for left state.
Updated minor for center state.
Updated minor for right state.
Updated minor for left state.
Updated height for center state.
Updated height for right state.
Updated height for left state.

2. Update Covariance and Gain Matrices

After the shape predictions are updated for all variables and all states at 126, the shape prediction covariance matrices, shape gain matrices, and shape estimate covariance matrices must be updated at 128. The shape prediction covariance accounts for error in the prediction process. The gain, as described above, represents the weight that the most recent measurement is to receive and accounts for errors in the measurement segmentation process. The shape estimate covariance accounts for error in the estimation process.

The prediction covariance is updated first. The equation to be used to update each shape prediction covariance matrix is as follows:

Shape Prediction Covariance Matrix=[State Transition Matrix*Old Estimate Covariance Matrix*transpose(State Transition Matrix)]+System Noise The state transition matrix is the matrix that embodies Newtonian mechanics used above to update the shape prediction. The old estimate covariance matrix is generated from the previous loop at 130. On the first loop from 126 through 132, step 128 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting noise constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely solely on the past estimate instead. The role played by gain is evidenced in the basic Kalman filter equation where $$X_{(new\ estimate)} = X_{(old\ estimate)} + \text{Gain}[-X_{(old\ estimate)} + X_{(measured)}]$$

The gain is not simply one number because one gain exists for each combination of shape variable and shape state. The general equation for updating the gain is as follows:

Gain=Shape Prediction Covariance Matrix*transpose(Measure Matrix)*inv(Residue Covariance)

The shape covariance matrix is calculated above. The measure matrix is simply a way of isolating and extracting the position component of a shape vector while ignoring the velocity and acceleration components for the purposes of determining the gain. The transpose of the measure matrix is simply [1 0 0]. The reason for isolating the position component of a shape variable is because velocity and acceleration are actually derived components, only position can be measured by a snapshot. Gain is concerned with the weight that should be attributed to the actual measurement.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is as follows:

Residue Covariance=[Measurement Matrix*Prediction Covariance*transpose(Measurement Matrix)]+Measurement Noise The measurement matrix is a simple matrix used to isolate the position component of a shape vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the shape estimate covariance matrix, which represents estimation error. As estimations are based on current measurements and past predictions, the estimate error will generally be less substantial than prediction error. The equation for updating the shape estimation covariance matrix is as follows:

> Shape Estimate Covariance Matrix=(Identity Matrix−Gain Matrix*Measurement Matrix)*Shape Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a shape vector from the velocity and acceleration components. The predictor covariance matrix is also computed and described above.

3. Update Shape Estimate

An update shape estimate process is invoked at 138. The first step in this process is to compute the residue.

> Residue=Measurement−(Measurement Matrix*Prediction Covariance)

Then the shape states themselves are updated.

> Updated Shape Vector Estimate=Shape Vector Prediction+ (Gain*Residue)

When broken down into individual equations, the results are as follows:

$$X^C_{(major\ at\ t)} = X^C_{(major\ at\ t)} + \text{Gain}[-X^C_{(major\ at\ t-1)} + X^C_{(measured\ major)}]$$

$$X^L_{(major\ at\ t)} = X^L_{(major\ at\ t)} + \text{Gain}[-X^L_{(major\ at\ t-1)} + X^L_{(measured\ major)}]$$

$$X^R_{(major\ at\ t)} = X^R_{(major\ at\ t)} + \text{Gain}[-X^R_{(major\ at\ t-1)} + X^R_{(measured\ major)}]$$

$$X^C_{(minor\ at\ t)} = X^C_{(minor\ at\ t)} + \text{Gain}[-X^C_{(minor\ at\ t-1)} + X^C_{(measured\ minor)}]$$

$$X^L_{(minor\ at\ t)} = X^L_{(minor\ at\ t)} + \text{Gain}[-X^L_{(minor\ at\ t-1)} + X^L_{(measured\ minor)}]$$

$$X^R_{(minor\ at\ t)} = X^R_{(minor\ at\ t)} + \text{Gain}[-X^R_{(minor\ at\ t-1)} + X^R_{(measured\ minor)}]$$

$$X^C_{(height\ at\ t)} = X^C_{(height\ at\ t)} + \text{Gain}[-X^C_{(height\ at\ t-1)} + X^C_{(measured\ height)}]$$

$$X^L_{(height\ at\ t)} = X^L_{(height\ at\ t)} + \text{Gain}[-X^L_{(height\ at\ t-1)} + X^L_{(measured\ height)}]$$

$$X^R_{(height\ at\ t)} = X^R_{(height\ at\ t)} + \text{Gain}[-X^R_{(height\ at\ t-1)} + X^R_{(measured\ height)}]$$

In the preferred embodiment, C represents the state of center, L represents the state of leaning left towards the driver, and R represents the state of leaning right away from the driver.

4. Generate Combined Shape Estimate

The last step in the repeating loop between steps 126 and steps 132 is a generate combined shape estimate step at 132. The first part of that process is to assign a probability to each shape vector estimate. The residue covariance is re-calculated, using the same formula as discussed above.

> Covariance Residue Matrix=[Measurement Matrix*Prediction Covariance Matrix*transpose(Measurement Matrix)]+Measurement Noise Next, the actual likelihood for each shape vector is calculated. The system 16 determines which state the occupant is in by comparing the predicted values for the various states with the recent best estimate of what the current values for the shape variables actually are.

$$\text{Likelihood}\begin{pmatrix} C \\ R \\ L \end{pmatrix} = e^{-(\text{residue}-\text{offset})^2/2\sigma^2}$$

There is no offset in the preferred embodiment of the invention because it is assumed that offsets cancel each other out, and that the system's 16 processes. Sigma represents variance, and is defined in the implementation phase of the invention by a human developer. It is known in the art how to assign a useful value for sigma by looking at data.

The state with the highest likelihood determines the sideways tilt angle Φ. If the occupant 18 is in a centered state, the sideways tilt angle is 0 degrees. If the occupant 18 is tilting left, then the sideways tilt angle is −Φ. If the occupant 18 is tilting towards the right, the sideways tilt angle is Φ. In the preferred embodiment of the invention, Φ and −Φ are predefined on the basis of the type and model of vehicle using the system 16.

Next, state probabilities are updated from the likelihood generated above and the pre-defined markovian mode probabilities discussed above.

$$P^C = P^{C-C} + P^{R-C} + P^{L-C}$$

$$P^R = P^{R-R} + P^{C-R}$$

$$P^L = P^{L-L} + P^{C-L}$$

The equations for the updated mode probabilities are as follows, where L represents the likelihood of a particular mode as calculated above:

> Probability of mode Left=1/[$L^{L*}(P^{L-L}+P^{C-L})+L^{R*}(P^{R-R}+P^{C-R})+L^{C*}(P^{C-C}+P^{R-C}+P^{L-C})]*L^{L*}(P^{L-L}+P^{C-L})$ > Probability of mode Right=1/[$L^{L*}(P^{L-L}+P^{C-L})+L^{R*}(P^{R-R}+P^{C-R})+L^{C*}(P^{C-C}+P^{R-C}+P^{L-C})]*L^{R*}(P^{R-R}+P^{C-R})$ > Probability of mode Center=1/[$L^{L*}(P^{L-L}+P^{C-L})+L^{R*}(P^{R-R}+P^{C-R})+L^{C*}(P^{C-C}+P^{R-C}+P^{L-C})]*L^{C*}(P^{C-C}+P^{L-C}+P^{L-C})$ The combined shape estimate is ultimately calculated by using each of the above probabilities, in conjunction with the various shape vector estimates.

> X=Probability of mode Left*$X^{Left}$+Probability of mode Right*$X^{Right}$+Probability of mode Center*$X^{Center}$ X is any of the shape variables, including a velocity or acceleration derivation of a measure value.

G. Motion Tracker and Predictor

The motion tracker and predictor 50 in FIG. 10 functions similarly in many respects, to the shape tracker and predictor 48 in FIG. 9. The motion tracker and predictor 50 tracks different characteristics and vectors than the shape tracker. In the preferred embodiment of the invention, the x-coordinate of the centroid and the forward tilt angle θ ("θ"), and their corresponding velocities and accelerations (collectively "motion variables") are tracked and predicted. The x-coordinate of the centroid is used to determine the distance between the occupant 18 and a location within the automobile such as the instrument panel 34, the airbag deployment system 36, or some other location in the automobile. In the preferred embodiment, the instrument panel 34 is used since that is where the airbag is generally deployed from.

The x-coordinate vector includes a position component (x), a velocity component (x), and an acceleration component (x). The θ vector similarly includes a position component (θ), a velocity component (θ̇), and an acceleration component (θ̈). Any other motion vectors will similarly have position, velocity, and acceleration components.

1. Update Motion Prediction

An update motion prediction process is performed at 134. This process takes the last motion estimate and extrapolates that estimate into a future prediction using a transition matrix.

Updated Vector Prediction=Transition Matrix*Last Vector Estimate

The transition matrix applies Newtonian mechanics to the last vector estimate, projecting forward a prediction of where the occupant 18 will be on the basis of its past position, velocity, and acceleration. The last vector estimate is produced at 138 as described below. The process from 134 to 136, from 136 to 138, and from 138 to 140, loops back to 134. The process at 134 requires that an estimate be previously generated at 138, so processing at 134 and 136 is not invoked the first time through the repeating loop that is steps 134–140.

The following equation is then applied for all motion variables and for all motion modes:

$$\text{Updated Vector Prediction} = \begin{pmatrix} 1 & t & \frac{1}{2}t^2 \\ 0 & 1 & t \\ 0 & 0 & 1 \end{pmatrix} * \begin{pmatrix} x \\ \dot{x} \\ \ddot{x} \end{pmatrix}$$

In the preferred embodiment of the invention, there would be six updated vector predictions at 134 because there are three motion modes and two motion variables in the preferred embodiment, and 3×2=6. The updated motion predictions are:

Updated x-coordinate for crash mode.
Updated x-coordinate for human mode.
Updated x-coordinate for stationary mode.
Updated θ for crash mode.
Updated θ for human mode.
Updated θ for stationary mode.

2. Update Covariance and Gain Matrices

After the motion predictions are updated for all motion variables and all modes at 134, the motion prediction covariance matrices, motion gain matrices, and motion estimate covariance matrices must be updated at 136. The motion prediction covariance accounts for error in the prediction process. The gain, as described above, represents the weight that the most recent measurement is to receive and accounts for errors in the measurement and segmentation process. The motion estimate covariance accounts for error in the estimation process.

The prediction covariance is updated first. The equation to be used to update each motion prediction covariance matrix is as follows:

Motion Prediction Covariance Matrix=State Transition Matrix*Old Estimate Covariance Matrix*transpose(State Transition Matrix)+System Noise The state transition matrix is the matrix that embodies Newtonian mechanics used above to update the motion prediction. The old estimate covariance matrix is generated from the previous loop at 136. On the first loop from 134 through 140, step 134 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting such constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely on the past estimate instead. The role played by gain is evidenced in the basic Kalman filter equation where $$X_{(new\ estimate)} = X_{(old\ estimate)} + \text{Gain}[-X_{(old\ estimate)} + X_{(measured)}]$$

The gain is not simply one number but an entire matrix because one gain exists for each combination of motion variable and motion mode. The general equation for updating the gain is as follows:

Gain=Motion Prediction Covariance Matrix*transpose(Measure Matrix)*inv(Residue Covariance)

The motion covariance matrix is calculated above. The measure matrix is simply a way of isolating and extracting the position component of a motion vector while ignoring the velocity and acceleration components for the purposes of determining the gain. The transpose of the measure matrix is simply [1 0 0]. The reason for isolating the position component of a motion variable is because velocity and acceleration are actually derived components. Position is the only component actually measured, and because gain is concerned with the weight that should be attributed to the actual measurement, derived variables should be isolated.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is as follows:

Residue Covariance=[Measurement Matrix*Prediction Covariance*transpose(Measurement Matrix)]+Measurement Noise The measurement matrix is a simple matrix used to isolate the position component of a motion vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the motion estimate covariance matrix, which represents estimation error. As estimations are based on current measurements and past predictions, the estimate error will generally be less substantial than the prediction error. The equation for updating the motion estimation covariance matrix is as follows:

Motion Estimate Covariance Matrix=(Identity Matrix−Gain Matrix*Measurement Matrix)*Motion Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a motion vector from the velocity and acceleration components. The predictor covariance matrix is also computed and described above.

3. Update Motion Estimate

An update motion estimate process is invoked at 138. The first step in this process is to compute the residue.

Residue=Measurement−(Measurement Matrix*Prediction Covariance)

Then the motion states themselves are updated.

Motion Vector Estimate=Motion Vector Prediction+ (Gain*Residue)

When broken down into individual equations, the results are as follows:

$$X^H_{(x\text{-}coordinate\ at\ t)}=X^H_{(x\text{-}coordinate\ at\ t)}+\text{Gain}[-X^H_{(x\text{-}coordinate\ at\ t\text{-}1)}+X^H_{(measured\ x\text{-}coordinate)}]$$

$$X^S_{(x\text{-}coordinate\ at\ t)}=X^S_{(x\text{-}coordinate\ at\ t)}+\text{Gain}[-X^S_{(x\text{-}coordinate\ at\ t\text{-}1)}+X^S_{(measured\ x\text{-}coordinate)}]$$

$$X^C_{(x\text{-}coordinate\ at\ t)}=X^C_{(x\text{-}coordinate\ at\ t)}+\text{Gain}[-X^C_{(x\text{-}coordinate\ at\ t\text{-}1)}+X^C_{(measured\ x\text{-}coordinate)}]$$

$$X^H_{(\theta\ at\ t)}=X^H_{(\theta\ at\ t)}+\text{Gain}[-X^H_{(\theta\ at\ t\text{-}1)}+X^H_{(measured\ \theta)}]$$

$$X^S_{(\theta\ at\ t)}=X^S_{(\theta\ at\ t)}+\text{Gain}[-X^S_{(\theta\ at\ t\text{-}1)}+X^S_{(measured\ \theta)}]$$

$$X^C_{(\theta\ at\ t)}=X^C_{(\theta\ at\ t\text{-}1)}+\text{Gain}[-X^C_{(\theta\ at\ t\text{-}1)}+X^C_{(measured\ \theta)}]$$

In the preferred embodiment, H represents the mode of human, C represents the mode of crash, and S represents the mode of stationary.

4. Generate Combined Motion Estimate

The last step in the repeating loop between steps 134 and steps 140 is a generate combined motion estimate step at 140. The first part of that process is to assign a probability to each motion vector estimate. The residue covariance is recalculated, using the same formula as discussed above.

Covariance Residue Matrix=[Measurement Matrix*Prediction Covariance Matrix*transpose(Measurement Matrix)]+Measurement Noise Next, the actual likelihood for each motion vector is calculated.

$$\text{Likelihood}\begin{pmatrix}C\\H\\S\end{pmatrix}=e^{-(\text{residue}-\text{offset})^2/2\sigma^2}$$

There is no offset in the preferred embodiment of the invention because it is assumed that offsets cancel each other out, and that the system's 16 processes are zero-mean Gaussian signals. Sigma represents variance, is defined in the implementation phase of the invention by a human developer. It is known in the art how to assign a useful value for sigma by looking at data.

Next, mode probabilities are updated from the likelihood generated above and the pre-defined markovian mode probabilities discussed above.

$$P^C=P^{C\text{-}C}+P^{S\text{-}C}+P^{H\text{-}C}$$

$$P^H=P^{H\text{-}H}+P^{S\text{-}H}+P^{C\text{-}H}$$

$$P^S=P^{S\text{-}S}+P^{H\text{-}S}+P^{C\text{-}S}$$

The equations for the updated mode probabilities are as follows, where L represents the likelihood of a particular mode as calculated above:

Probability of mode Stationary=$1/[L^S*(P^{S\text{-}S}+P^{H\text{-}S}+P^{C\text{-}S})+L^H*(P^{H\text{-}H}+P^{S\text{-}H}+P^{C\text{-}H})+L^C*(P^{C\text{-}C}+P^{S\text{-}C}+P^{H\text{-}C})]*L^S*(P^{S\text{-}S}+P^{H\text{-}S}+P^{C\text{-}S})$ Probability of mode Human=$1/[L^S*(P^{S\text{-}S}+P^{H\text{-}S}+P^{C\text{-}S})+L^H*(P^{H\text{-}H}+P^{S\text{-}H}+P^{C\text{-}H})+L^C*(P^{C\text{-}C}+P^{S\text{-}C}+P^{H\text{-}C})]*L^H*(P^{H\text{-}H}+P^{S\text{-}H}+P^{C\text{-}H})$ Probability of mode Crash=$1/[L^S*(P^{S\text{-}S}+P^{H\text{-}S}+P^{C\text{-}S})+L^H*(P^{H\text{-}H}+P^{S\text{-}H}+P^{C\text{-}H})+L^C*(P^{C\text{-}C}+P^{S\text{-}C}+P^{H\text{-}C})]*L^C*(P^{C\text{-}C}+P^{S\text{-}C}+P^{H\text{-}C})$ The combined motion estimate is ultimately calculated by using each of the above probabilities, in conjunction with the various motion vector estimates.

X=Probability of mode Human*$X^{Human}$+Probability of mode Crash*$X^{Crash}$+Probability of mode Stationary*$X^{Stationary}$ X is any of the motion variables, including a velocity or acceleration derivation.

H. ARZ Intrusion Indicator

The ARZ Intrusion Indicator at 52 takes the outputs of both the shape indicator at 26 and the motion tracker at 28 and determines if the occupant is within the At-Risk-Zone ("ARZ"), an area predefined to be too close to the airbag to allow safe deployment of the airbag. This calculation can utilize any of the motion or shape variables, or even characteristics that are not shape or motion variables. In the preferred embodiment, the ARZ Intrusion Indicator 52 determines whether or not the closest point on the upper ellipse 58 is within the predefined ARZ. In the preferred embodiment, the ARZ is defined taking into consideration the specific environment presented by a particular type of automobile. The ARZ Intrusion Indicator 52 also determines whether or not the occupant 18 is leaning so far to the driver side of the automobile, that the occupant 18 is not within the ARZ. ARZ calculations are updated very quickly using the outputted state transition matrix which allows the system 16 to predict the position and shape in advance, and at a rate more quickly than the rate in which the sensor 22 collects data.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

What is claimed is:

1. An image processing system for use with an airbag deployment system having a seat, an occupant in the seat, a sensor for generating sensor measurements, an airbag, and an airbag controller, said image processing system comprising:
   an iterative tracking and predicting system, wherein said tracking and predicting system tracks and predicts the movement of an occupant in a seat by incorporating the most recent sensor measurement and past predictions into an estimate of the occupant's position.

2. An image processing system as in claim 1, which can generate predictions at a quicker rate than the rate at which the sensor captures measurements.

3. An image processing system as in claim 1, wherein said iterative tracking and predicting system utilizes a plurality of Kalman filters.

4. An image processing system as in claim 1, further comprising an at-risk-zone intrusion indicator, wherein said at-risk-zone intrusion indicator uses said prediction from said iterative tracking and predicting system to determine whether an occupant would be in a predefined at-risk-zone by the time an airbag were to deploy.

5. An image processing system as in claim 1, said tracking and predicting system further comprising:
   a shape tracker and predictor subsystem, wherein said shape tracker and predictor subsystem tracks and predicts characteristics indicating the shape of the occupant; and
   a motion tracker and predictor subsystem, wherein said motion tracker and predictor subsystem tracks and predicts characteristics indicating the motion of the occupant.

6. An image processing system as in claim 5, wherein the characteristics tracked and predicted by said shape tracker and predictor subsystem comprise:
   a height of the occupant; and
   a shape of the occupant's upper torso.

7. An image processing system as in claim 5, wherein said characteristics tracked and predicted by said motion tracker and predictor subsystem comprise:
   a distance between the occupant and the airbag; and
   a forward tilt angle.

8. An image processing system as in claim 5, wherein said shape tracker and predictor utilizes predefined shape states.

9. An image processing system as in claim 8, wherein said predefined states comprise
   a state of leaning left;
   a state of leaning right; and
   a state of sitting generally centered.

10. An image processing system as in claim 5, wherein said motion tracker and predictor utilizes predefined motion modes.

11. An image processing system as in claim 10, wherein said predefined motion modes comprise:
   a mode of crashing;
   a mode of being stationary; and
   a mode of being human.

12. An image classification system as in claim 5, wherein said shape tracker and predictor comprises:
   an update shape predictor;
   an update covariance and gain matrices generator;
   an update shape estimator; and
   a combined shape estimate generator.

13. An image classification system as in claim 5, wherein said motion tracker and predictor comprises:
   an update motion predictor;
   an update covariance and gain matrices generator;
   an update motion estimator; and
   a combined motion estimate generator.

14. An image processing system as in claim 5, wherein said shape tracker and predictor determines a sideways tilt angle of the occupant.

15. An image processing system for use with an airbag deployment system having a seat, an occupant in the seat, an optical sensor, an airbag, a segmentation device, an airbag controller, said image processing system comprising:
   a tracking and predicting system, wherein said tracking and predicting system tracks a plurality of variables regarding an occupant;
   an ARZ intrusion indicator, wherein said ARZ intrusion indicator determines which point of the occupant's upper torso is closest to the airbag, and whether the occupant will be in a position within a predefined danger zone by the time the airbag could be deployed; and
   wherein said tracking and predicting system integrates past predictions with current measurements utilizing probability weighted heuristics.

16. An image processing system as in claim 15, wherein said tracking and predicting system utilizes an upper ellipse to represent the upper torso of the occupant.

17. An image processing system as in claim 15, wherein said tracking and predicting system utilizes a plurality of Kalman filters for various image characteristics.

18. An image processing system as in claim 15, wherein said tracking and predicting system can generate estimates on a more frequent basis that the sensor can capture occupant images.

19. An image processing system as in claim 15, wherein said tracking and predicting system further comprises:
   a shape tracker and predictor subsystem, wherein said shape tracker and predictor subsystem tracks and predicts characteristics indicating the shape of the occupant; and
   a motion tracker and predictor subsystem, wherein said motion tracker and predictor subsystem tracks and predicts characteristics indicating the motion of the occupant image with respect to the location of the airbag.

20. An image processing system comprising:
   a sensor for capturing an image of a seat area;
   a segmentation subsystem for extracting a segmented image of an occupant from an ambient image of a seat area;
   an ellipse fitting subsystem which fits an upper ellipse to the upper torso of an occupant, a lower ellipse to the bottom portion of an occupant, and a centroid in said upper ellipse;
   a tracking and predicting system, further comprising a shape tracker and predictor and a motion tracker and predictor; and
   an at-risk-zone intrusion indicator, wherein said at-risk-zone intrusion indicator determines which point on the upper ellipse is closest to the airbag, and wherein said at-risk-zone intrusion indicator informs the airbag controller whether the occupant will be in a position within a predefined danger zone by the time the airbag is deployed;
   wherein said shape tracker and predictor tracks and predicts predefined shape characteristics using a Kalman filter equation for each predefined shape state, and wherein said shape tracker and predictor weighs each Kalman filter using the predefined probabilities associated with said shape states, to generate an overall prediction for each said shape characteristic; and
   wherein said motion tracker and predictor predicts predefined motion characteristics using a Kalman filer equation for each predefined motion mode and weighs the predefined probabilities associated with said motion modes, to generate an overall prediction for each said motion characteristic.

21. A method for predicting the movement of an image, comprising the steps of:
   applying a plurality of mathematical heuristics to a plurality of image characteristics to incorporate past measurements and past predictions into an updated overall prediction of said plurality of image characteristics, wherein the image is in one of a plurality of predefined modes and states; and
   using said updated characteristic predictions to determine whether the image will enter an ARZ.

* * * * *